United States Patent
Salisbury

(10) Patent No.: US 10,730,605 B2
(45) Date of Patent: Aug. 4, 2020

(54) AIRCRAFT JOINT

(71) Applicant: Airbus Operations Limited, Bristol (GB)

(72) Inventor: Ross Salisbury, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 362 days.

(21) Appl. No.: 15/592,618

(22) Filed: May 11, 2017

(65) Prior Publication Data
US 2017/0327245 A1     Nov. 16, 2017

(30) Foreign Application Priority Data

May 11, 2016   (GB) .................................. 1608287.7

(51) Int. Cl.
*B64C 3/28*      (2006.01)
*B64C 3/26*      (2006.01)

(52) U.S. Cl.
CPC . *B64C 3/28* (2013.01); *B64C 3/26* (2013.01)

(58) Field of Classification Search
CPC .. B64C 1/069; B64C 1/12; B64C 1/26; B64C 3/26; B64C 3/28; B64C 3/187; B64C 5/08

See application file for complete search history.

(56) References Cited

U.S. PATENT DOCUMENTS

| | | | | |
|---|---|---|---|---|
| 2,473,728 | A | * | 6/1949 | Rutledge ............... F16B 5/0044 244/123.1 |
| 2008/0156936 | A1 | | 7/2008 | McBroom |
| 2008/0164376 | A1 | * | 7/2008 | Kato .......................... B64C 3/28 244/132 |
| 2015/0048207 | A1 | | 2/2015 | Williams et al. |

FOREIGN PATENT DOCUMENTS

| | | |
|---|---|---|
| CN | 201395244 | 2/2010 |
| WO | WO 2010/089578 | 8/2010 |
| WO | 2013/079918 | 6/2013 |

OTHER PUBLICATIONS

European Search Report cited in EP 17 16 9317 dated Oct. 17, 2017, seven pages.
Search Report for GB1608287.7 dated Oct. 31, 2016, 3 pages.

* cited by examiner

*Primary Examiner* — Jessica B Wong
(74) *Attorney, Agent, or Firm* — Nixon & Vanderhye P.C.

(57) ABSTRACT

An aircraft joint includes a first component having an outer aerodynamic surface and an inner surface, a second component having an outer aerodynamic surface and an inner surface, and a strap assembly bridging between the inner surfaces of the first and second components. The strap assembly has a first strap part attached to the inner surface of the first component, a second strap part attached to the inner surface of the second component, and a third strap part received in the first and second strap parts in a sliding manner. The third strap part when received in the first and second strap parts constrains movement of the first component relative to the second component in a direction normal to the outer aerodynamic surfaces of the first and second components in the vicinity of the strap assembly.

17 Claims, 4 Drawing Sheets

AIRCRAFT JOINT

RELATED APPLICATION

This application claims priority to United Kingdom Patent Application GB1608287.7 filed May 11, 2016, the entire contents of each of which are hereby incorporated by reference.

FIELD OF THE INVENTION

The present invention relates to a joint between two components. The invention also relates to a method of forming such a joint.

BACKGROUND OF THE INVENTION

Aircraft wings commonly comprise a wing box structure with spanwise extending front and rear spars, and ribs extending chordwise between the front and rear spars. Upper and lower wing covers extend between the spars to form the upper and lower boundaries of the wing box. Leading and trailing edge structures, forward and aft of the front and rear spars respectively, typically comprise ribs and panels. Trailing edge panels are commonly substantially planar, whereas leading edge panels are commonly curved.

The covers and panels are typically fastened to the ribs and spars. The leading and trailing edge panels may extend spanwise across multiple ribs. The panels are typically joined to the wing covers e.g. by fastening butt-straps across the interior side of the joint, or by providing a joggle at the edge of the wing cover adjacent the panel and fastening the panel to the wing cover at the joggle.

In recent years there have been significant research developments into aerofoils which achieve laminar flow. Laminar flow aerofoils achieve laminar flow over the upper aerodynamic surface for a greater percentage of the wing chord than does a traditional turbulent wing. Active boundary layer control (e.g. suction devices) may be used to promote laminar flow but natural laminar flow wings achieve this passively. Natural laminar flow wings are designed (mostly by control of camber and leading edge radius) to achieve favourable pressure gradients resulting in significant runs of laminar flow. Laminar flow is typically limited in chordwise extent by shocks or boundary layer flow separation. Hybrid laminar flow aerofoils combine the effects of active and passive laminar flow control.

Surface roughness of the outer aerodynamic surface, particularly at the upper surface leading edge, will significantly affect the ability to achieve laminar flow. A laminar flow transonic aircraft fixed wing upper surface preferably has a maximum step height below 50 microns over at least 30% of the aerofoil chord from the aerodynamic leading edge. The fastener heads and fastener holes conventionally used to attach leading edge panels to leading edge ribs and to the wing covers are unlikely to be able to satisfy this step condition.

Furthermore, aircraft wing leading edge panels are subjected to particularly harsh environmental conditions. Hail, rain, ice, dust, debris, insects, birds and lightning are examples of items that may strike the exposed wing leading edge. Over time or after a significant impact it may become necessary to replace the leading edge panel. Removal of very many fasteners joining the leading edge panel to the leading edge ribs and the wing cover, and installation of a new panel again with very many fasteners, is time consuming leading to costly downtime of the aircraft for maintenance. This problem may be exacerbated by a move to natural laminar flow aerofoils, as the tighter tolerance for surface smoothness may lead to more frequent leading edge panel replacements. Reducing the time for replacement of the leading edge panel is therefore desirable.

SUMMARY OF THE INVENTION

A first aspect of the invention provides an aircraft joint comprising a first component having an outer aerodynamic surface and an inner surface, a second component having an outer aerodynamic surface and an inner surface, and a strap assembly bridging between the inner surfaces of the first and second components, the strap assembly comprising a first strap part attached to the inner surface of the first component, a second strap part attached to the inner surface of the second component, and a third strap part slidingly receivable in the first and second strap parts, wherein the third strap part when received in the first and second strap parts constrains movement of the first component relative to the second component in a direction normal to the outer aerodynamic surfaces of the first and second components in the vicinity of the strap assembly.

A further aspect of the invention provides a method of forming an aircraft joint according to any preceding claim, the method comprising attaching the first strap part to the first component, attaching the second strap part to the second component, bringing the first and second components together to a desired position, and sliding the third strap part so as to be received in the first and second strap parts.

The invention is advantageous in that the strap assembly is fully concealed below the outer aerodynamic surfaces at the joint and has no parts exposed in the outer aerodynamic surfaces at the joint. This improves the ability to retain laminar flow (natural, passive, active or hybrid laminar flow) at the joint where this is desirable. The sliding connection of the third strap part in the first and second strap parts allows for ease of assembly and/or disassembly of the joint.

The third strap part constrains movement of the first component relative to the second component in a direction normal to the outer aerodynamic surfaces of the first and second components in the vicinity of the strap assembly. Constraining movement thereby provides a generally fixed or rigid joint, equivalent to a joint secured by fasteners. Thus, the strap assembly prevents, or minimises, relative movement between the first and second components that may cause a disruption to the outer aerodynamic profile, such as a drag-inducing step between respective edges of the first and second components. The joint may hold or maintain the first component in a generally fixed position relative to the second component, so that the outer aerodynamic surfaces of the first and second components may be substantially flush across the joint.

The third strap part may be a substantially planar strip. The strip may be metallic. The third strap part may be of a generally rigid or inflexible material.

The first strap part may have a blind slot for receiving the third strap part therein.

The second strap part may have a through slot for receiving the third strap part therein.

At least one of the first strap part and the second strap part may include an adjuster for adjustment of an offset between the third strap part and the inner surface of the respective first or second strap parts.

The strap assembly may be arranged to automatically retain the third strap part when the third strap part is fully seated within the first strap part.

The third strap part may be removable from the first strap part.

The strap assembly may include a quick release mechanism to permit ready removal of the third strap part from the first strap part.

The first strap part and/or the second strap part may be attached by bonding to the respective first or second components.

The outer aerodynamic surfaces of the first and second components may be substantially flush across the joint. The outer aerodynamic surfaces of the first and second components may be configured to enable laminar flow across the joint. The laminar flow may extend from forward of the joint to a position downstream of the joint in the flow direction. The laminar flow may be natural, passive, active or hybrid laminar flow.

One of the first and second components may include a joggle such that the outer surface at an end of the joggled component abuts the inner surface of the other of the first and second components.

The joint may comprise a plurality of the strap assemblies bridging between the inner surfaces of the first and second components.

The first and second components may be aircraft wing components. For example, the first and second components may be a wing cover and a wing panel. A wing cover (or skin) is a structural component of an aircraft wing box. By contrast a wing panel is a non-structural component, i.e. it does not carry the main wing loads and simply provides the aerodynamic shape of the wing. Wing panels are typically provided at the leading edge (forward of the wing front spar) and at the trailing edge (aft of the wing rear spar) of the wing.

Alternatively the first and second components may be an access panel and a surrounding structure or fairing. The access panel may be easily removed for access to services or the like behind the panel. The surrounding structure may be an aircraft fuselage, empennage, nose, etc. or a fairing, e.g. a belly fairing, wing root joint fairing, etc. The benefits of ease of assembly/disassembly of the joint may be enjoyed both in location where maintenance of laminar flow over the outer aerodynamic surfaces at the joint is important and in locations where this is not important.

The first and second components may be a wing upper cover and a wing leading edge panel. The wing leading edge panel may extend in a spanwise direction between leading edge ribs, and each spanwise end of the wing leading edge panel is attached to the ribs by fasteners, and an aft edge of the wing leading edge panel extending between the spanwise ends may be coupled to the wing cover by a plurality of the strap assemblies.

A further yet aspect of the invention provides a method of replacing a panel on an aircraft wing, the aircraft wing comprising a wing cover having an outer aerodynamic surface and an inner surface, a wing panel having an outer aerodynamic surface and an inner surface, and a strap assembly bridging between the inner surfaces of the wing cover and the wing panel, the strap assembly comprising a first strap part attached to the inner surface of the wing cover, a second strap part attached to the inner surface of the wing panel, and a third strap part slidingly receivable in the first and second strap parts, wherein the third strap part when received in the first and second strap parts constrains movement of the wing cover relative to the wing panel in a direction normal to the outer aerodynamic surfaces of the wing cover and wing panel in the vicinity of the strap assembly, the method comprising sliding the third strap part free from the first strap part, removing the wing panel having the second strap part attached thereto, providing a replacement wing panel and second strap part substantially identical to the wing panel and second strap part removed, positioning the replacement wing panel on the aircraft wing, and sliding the third strap part so as to be received in the first strap part.

The third strap part may be removed with the second strap part and replaced with a replacement third strap part substantially identical to the third strap part removed, where the step of sliding the third strap part so as to be received in the first strap part relates to the sliding of the replacement third strap part.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
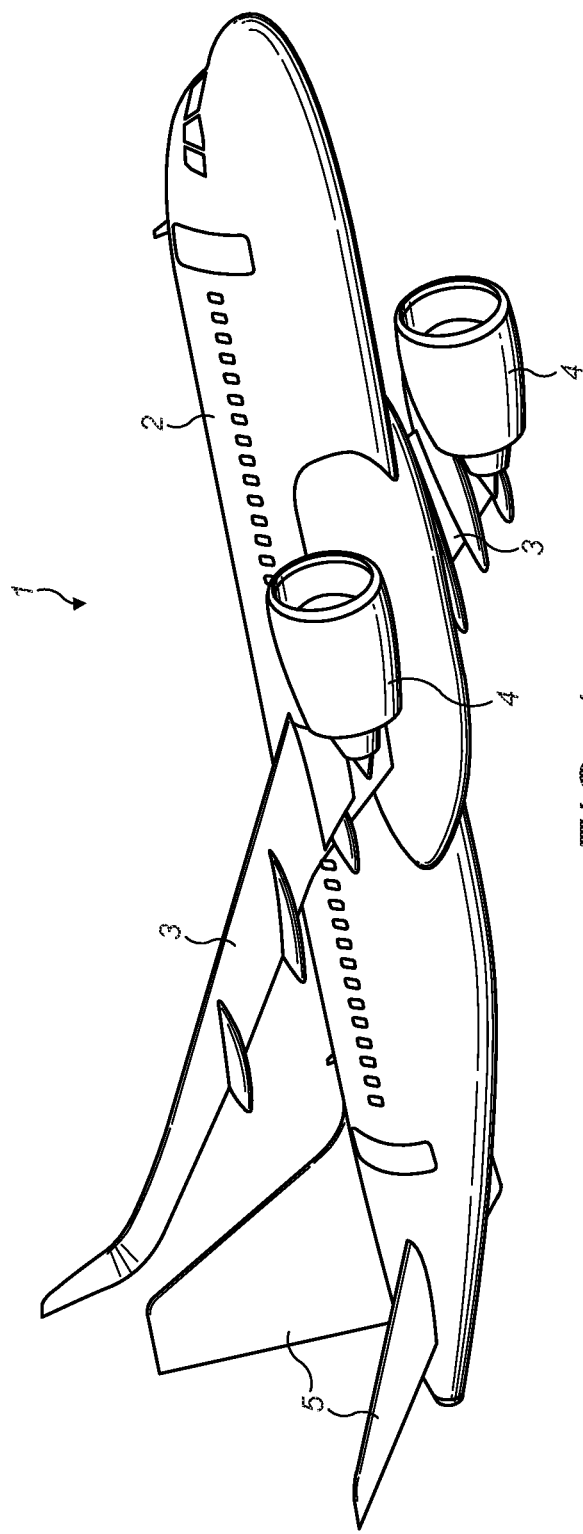
FIG. 1 illustrates a fixed wing aircraft.

FIG. 1 illustrates a typical configuration for a fixed wing passenger transonic jet transport aircraft 1. The aircraft 1 comprises a fuselage 2, wings 3, main engines 4 and horizontal and vertical tailplanes 5. It will be appreciated that this invention is applicable to a wide variety of aircraft types not just that illustrated in FIG. 1. For example, the aircraft, may be for commercial or military purposes, may be for transporting passengers or cargo, may have jet, propeller or other engine propulsion systems, may have a variety of fuselage/wing configurations, e.g. a high wing, low wing or blended wing body, and may be designed to fly at subsonic, transonic or supersonic speeds.

Figure 2:
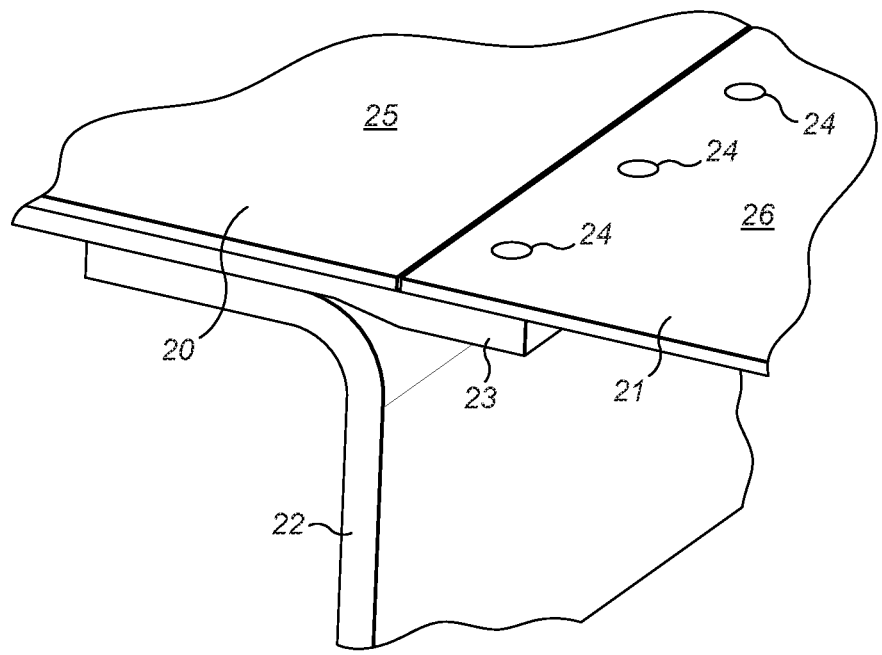
FIG. 2 illustrates schematically a known joint between an upper wing cover and a wing leading edge panel comprising a row of fasteners.

FIG. 2 illustrates a known joint between an upper wing cover 20 and a wing leading edge panel 21. The upper wing cover 20 is attached to a front spar 22. A forward edge of the upper wing cover 20 includes a joggle 23 and the wing leading edge panel 21 is fastened to the upper wing cover 20 by a plurality of fasteners 24. The outer surface 25 of the upper wing cover 20 and the outer surface 26 of the wing leading edge panel 21 are arranged substantially flush across the joint. The fasteners are countersunk but nevertheless the line of fasteners 24 provide exposed fastener heads which create a small but appreciable step in the upper surface of the wing adjacent the leading edge, which may have a detrimental effect on laminar flow. The outer aerodynamic surfaces of the first and second components are configured to enable laminar flow across the joint. The laminar flow may extend from forward of the joint to a position downstream of the joint in the flow direction. The laminar flow may be natural, passive, active or hybrid laminar flow.

Figure 3:
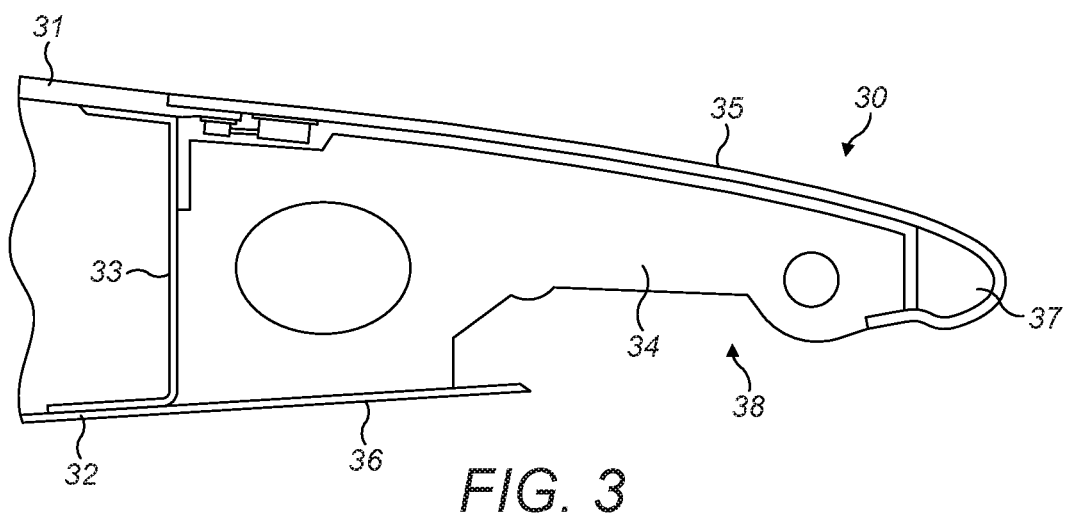
FIG. 3 illustrates a side view of a leading edge region of a laminar flow aerofoil for a fixed wing aircraft.

FIG. 3 illustrates a cutaway side view of the leading edge region of a laminar flow aerofoil for a fixed wing aircraft such as that shown in FIG. 1. The laminar flow wing 30 includes an upper wing cover 31, a lower wing cover 32, a front spar 33, a leading edge rib 34, an upper leading edge panel 35 and a lower leading edge panel 36.

The upper and lower wing covers 31, 32 are attached to the front spar 33. A plurality of the leading edge ribs 34 are provided spaced spanwise in front of the front spar 33 and are fixed thereto. The lower leading edge panel 36 extends spanwise across multiple leading edge ribs 34 and is attached to the ribs 34 and to the forward edge of the lower wing cover 32. The upper leading edge panel 35 also extends spanwise across a plurality of the leading edge ribs 34. The upper leading edge panel 35 extends forward of the upper wing cover 31 to the leading edge 37 of the wing 30 and curls under to attach to the underside of the rib 34 just aft of the wing leading edge 37. A cavity 38 is formed between the wing leading edge panels 37 and 36 which receives a Krueger flap high lift device (not shown). A joint used to attach upper leading edge panel 35 to the ribs 34 and the upper wing cover 31 forms the subject of this invention.

Figure 4:
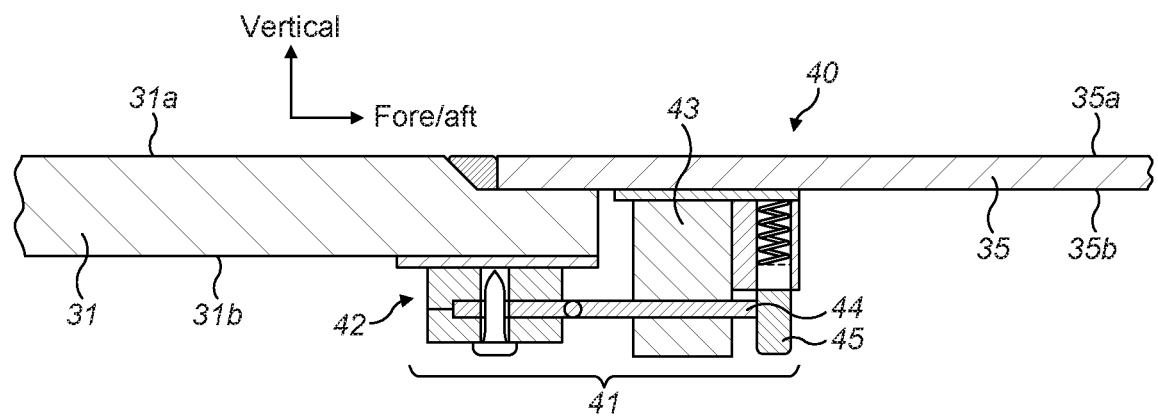
FIG. 4 illustrates a side view of a joint between a wing cover and a leading edge panel according to an embodiment of the invention.

FIG. 4 shows in detail a side view of the joint 40 between the upper wing cover 31 and the upper wing leading edge panel 35. The upper wing cover 31 has an outer aerodynamic surface 31a and an inner surface 31b opposite the outer surface 31a. The upper wing leading edge panel 35 has an outer aerodynamic surface 35a and an inner surface 35b opposite the outer surface 35a. A strap assembly 41 bridges between the inner surfaces 31b and 35b of the upper wing cover 31 and the upper wing leading edge panel 35, respectively.

The strap assembly 41 comprises a first strap part 42 attached to the inner surface 31b of the upper wing cover 31. A second strap part 43 is attached to the inner surface 35b of the upper wing leading edge panel 35. A third strap part 44 is slidingly received in the first and second strap parts 42, 43. A quick release mechanism 45 retains the third strap part 44 fully seated within the first strap part 42. When the third strap part 44 is fully received in the first and second strap parts 42, 43, movement of the upper leading edge panel 35 relative to the upper wing cover 31 in a vertical direction (i.e. normal to the outer surfaces 31a, 35a of the upper wing cover 31 and the upper wing leading edge panel 35) is constrained in the vicinity of the strap assembly 41. The joint 40 therefore holds the wing leading edge panel 35 in contact with the joggled wing upper cover 31 and stops relative vertical movement between these components. All parts of the strap assembly 41 sit inside the wing 30 within the wing leading edge region and therefore avoid any disturbance to the laminar flow around the outer surface of the wing 30.

The first strap part 42 is attached to the inner surface 31b of the upper wing cover 31 by bonding. Likewise, the second strap part 43 is attached to the inner surface 35b of the upper wing leading edge panel 35 by bonding. Any suitable aerospace grade adhesive or similar may be used for this purpose. Since the leading edge panel 35 is a 'panel', i.e. it does not carry the main wing loads and is provided simply to maintain the aerodynamic shape of the wing, bonding of the first and second strap parts is sufficient.

It will be appreciated that in other embodiments the first strap part 42 may be attached to the wing upper cover 31 by other attachment means including, for example, by fasteners. It is preferable that where fasteners are used, these do not have exposed fastener heads in the outer aerodynamic surface of the wing.

The first strap part 42 has a blind slot 46 for receiving the third strap portion 44, and the second strap part has a through slot 47 for receiving the third strap part 44 therein. The third strap part 44 in the illustrated embodiment is a substantially planar metallic strip which when fully seated in the first and second strap parts 42, 43, substantially occupies the blind slot 46 and the through slot 47 in the first and second strap parts 42, 43. The third strap part 44 has a side lever 48 for advancing and retracting the third strap part 44 in the fore/aft direction for sliding movement of the proximal end 44a into and out of the slot 46 formed in the first strap part 42. The third strap part 44 is moved manually. When the proximal end 44a of the third strap part 44 is fully retracted it is clear of the slot 46 formed in the first strap part 42.

The first strap part 42 has a two piece construction to provide for vertical adjustment to ensure that the outer aerodynamic surface 31a of the upper wing cover 31 and the outer aerodynamic surface 35a of the upper wing leading edge panel 35 are substantially flush. This may account for tolerance variations, particularly the thickness of the CFRP wing cover 31. This vertical adjustment is affected by adjustment of adjuster screws 49 on either side of the two piece first strap part 42. Adjustment of these adjuster screws 49 moves the two pieces of the first strap part 42 towards and away from one another in the vertical direction which provides adjustment of a vertical offset between the slot 46, which receives the third strap part 44, and the inner surface 31b of the upper wing cover 31.

It will be appreciated that whilst in the illustrated embodiment the second strap part 43 is formed as a single piece construction, in an alternative variant the second strap part 43 may be formed as a two piece construction with adjustment screws similar to those described above. The vertical offset adjustment of the second strap part 43 may be provided in addition to or as an alternative to the vertical offset adjustment of the first strap part 42.

Figure 6:
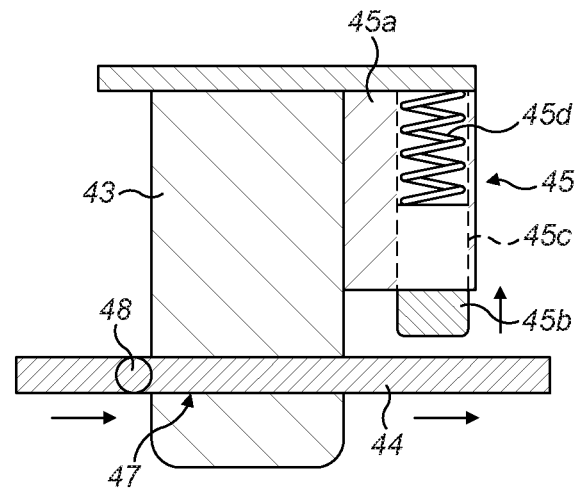
FIG. 6 illustrates disconnection of the joint for maintenance or repair.

The quick release retaining mechanism 45 of the strap assembly 41 is shown in detail in FIG. 6 and includes a housing 45a, a button 45b slidable in a vertical direction within a slot 45c, where the button 45b is biased by a spring 45d in a direction away from the inner surface 35b of the upper wing leading edge panel 35.

Figure 5:
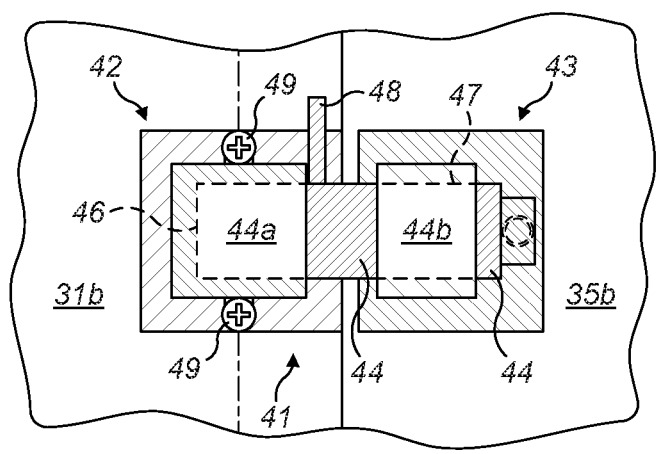
FIG. 5 illustrates a plan view of the joint of FIG. 4.

FIG. 4 shows the quick release retaining mechanism 45 in a first position in which the button 45b is fully extended from the housing 45a so as to retain the third strap part 44 with the proximal end 44a of the third strap part 44 fully seated in the slot 46 in the first strap part 42. As can be seen in FIGS. 4 and 5, the button 45b bears against a distal end 44b of the third strap part opposite the proximal end 44a. As shown in FIG. 6, movement of the button 45b manually against the spring 45d bias causes the button 45b to disengage from the distal end 44b of the third strap part 44 allowing the third strap part 44 to be slid manually using the side lever 48 such that the proximal end 44a of the third strap part 44 is moved clear of the slot 46 in the first strap part 42.

Note that due to the provision of the side lever 48, the third strap part 44 remains within the through slot 47 formed in the second strap part 43. Advancing the third strap part 44 using the side lever 48 into the slot 46 in the first strap part 42 until it becomes fully seated causes the distal end 44b to move clear of the button 45b such that the button 45b is extended under the biasing action of the spring 45d.

Figure 7:
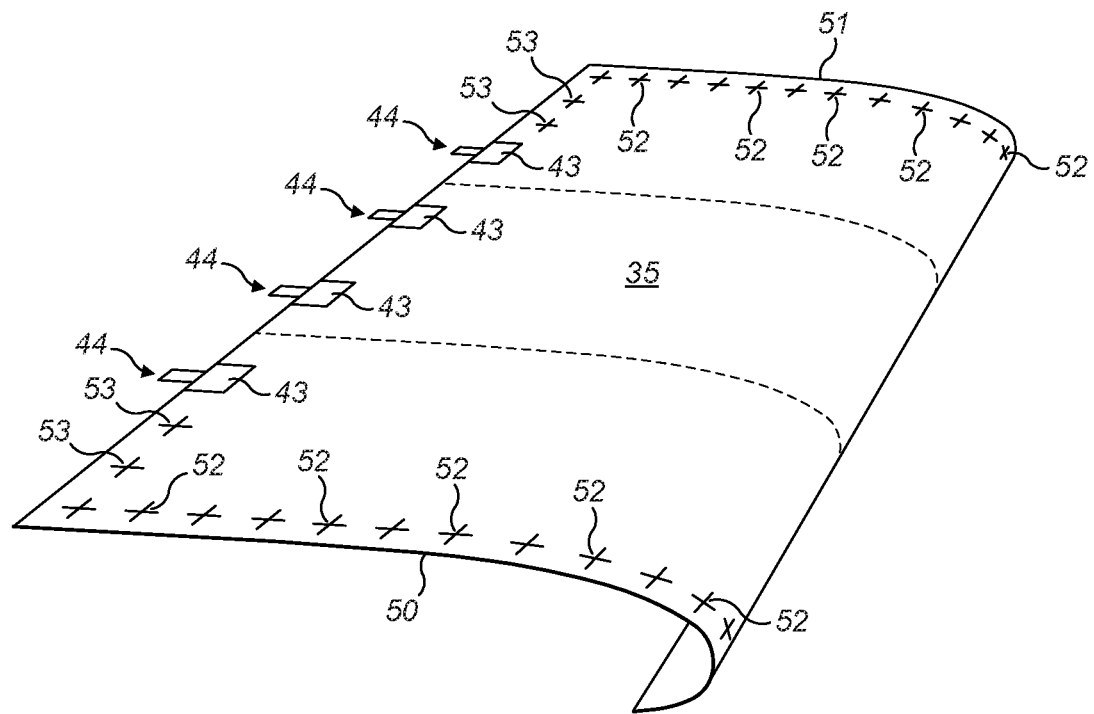
FIG. 7 illustrates a perspective view of the leading edge panel.

FIG. 7 illustrates a schematic perspective view of the panel 35 having a plurality of the strap assemblies 41. The upper wing leading edge panel 35 has an inboard edge 50 and an outboard edge 51 in the spanwise wing direction. Adjacent to the inboard and outboard edges a row of fasteners 52 is provided for attachment of the upper wing leading edge panel 35 to respective leading edge ribs 34. The location of two further intermediate leading edge ribs 34 is shown generally by the broken lines in FIG. 7 and further structural connections are provided (not shown), e.g. lug and pin connections for attaching the upper wing leading edge panel 35 to these intermediate ribs 34 at these locations.

The plurality of strap assemblies 41 are provided in the vicinity of these intermediate ribs 34 for joining the upper wing leading edge panel 35 to the upper wing cover 31. In this way, it becomes possible to significantly reduce the number of fasteners used to retain the upper wing leading edge panel 35 to the upper wing cover 31. The structural fasteners 52 and 53 etc. are sufficient to retain and constrain movement of the leading edge panel 35 in the vicinity of the intermediate ribs 34 and at each edge 50, 51 of the panel. The strap assemblies 41 therefore only need to constrain the vertical movement of the aft edge of the leading edge panel between the intermediate ribs 34 and between the intermediate ribs 34 and the inboard and outboard edges 50, 51 of the panel 35.

For manufacturing and other reasons, the upper wing leading edge panel 35 has a span which may be less than the span of the wing. In such situations, a plurality of the upper wing leading edge panel 35 may be provided spanwise across the wing 30. A so-called 'turbulent wedge' of turbulent airflow is accepted which fans out in the downstream flow direction from the forward most ones of the fasteners 52. It is therefore also acceptable to provide the additional fasteners 53 for attachment of the upper wing leading edge panel 35 to the joggled upper wing cover 31 a short distance away from the inboard and outboard edges 50, 51 of the upper wing leading edge panel 35. Since the airflow in the turbulent wedge is already turbulent, there is no further aerodynamic detrimental effect from the provision of these additional fasteners 53. However, it may nevertheless be desirable to replace these fasteners 53 with further strap assemblies 41.

The leading edge panel 35 is installed as follows. A plurality of the first parts 42 of the plurality of strap assemblies 41 are bonded to the inner surface 31b of the wing cover 31 at predetermined locations spaced spanwise across the cover. A plurality of the second parts 43 of the plurality of strap assemblies 41 are bonded to the inner surface 35b of the leading edge panel 35 at locations corresponding to the those of the first strap parts 42. The second strap parts 43 each have a respective third strap part 44 slidably received therein in their retracted position with the quick release retainer assembly 45 open.

The panel 35 is then offered up to the wing 30 and the fasteners 52, 53 are installed. The fasteners 52, 53 may be installed with access from both the inner and outer surfaces of the panel 35 or by access from only the outer surfaces, as necessary. With access from the side of the inner surfaces of the cover 31 and panel 35 the slide levers 48 are advanced to move the third strap parts 44 until they engage with the respective slots 46 of the respective first strap parts 42. When each third strap part 44 is fully advanced the quick release retainer assembly 45 will automatically close to retain the third strap part 44.

In case any adjustment is required to ensure the outer surfaces of the wing cover 31 and the leading edge panel 35 are flush the adjuster screws 49 are rotated. This adjustment may be performed before or after the third strap parts 44 are each advanced.

To replace the leading edge panel 35, the quick release retainer assemblies 45 are each opened and the respective third strap parts 43 are retracted until the end 44a of the third strap parts are all clear of their respective first strap parts 41. Access to the strap assemblies may be through the aperture 38 in the wing, which may require deployment of the Krueger high lift device. Alternatively, the access may be through an access panel in the leading edge lower surface. The fasteners 52, 53 are each removed. Fastener removal and release of the strap assemblies 41 may be taken in any order as desired. Once all fasteners 52, 53 and all strap assemblies 41 are released the panel 35 can be removed from the wing 30. A replacement panel 35 having a plurality of replacement second 43 and third 44 strap parts and retainer assemblies 45 (each substantially identical to those parts being replaced) is then offered up to the wing 30. Fasteners 52, 53 or replacements thereof are then (re)installed and the third strap parts 44 are each advanced until fully seated in their respective first strap parts such that the quick release retainer assemblies 45 close. The Kruger may then be moved back to its retracted position.

The strap assemblies 41 allow for a reduction in the number of fasteners used for joining the wing cover 31 to the leading edge panel 35. Reducing the number of fasteners has advantages twofold. Firstly, the number of exposed fastener heads in the outer aerodynamic surface is reduced. This is particularly beneficial in areas where the local flow is expected to be laminar as it enables laminar flow to be maintained for as far as possible in the downstream flow direction. Secondly, the fewer number of fasteners enables faster installation and removal of the panel 35 from the wing 30. This improves manufacturing time for new aircraft and reduces maintenance downtime.

Inspection of the strap assemblies 41 may require deployment of the Krueger high lift device to open aperture 38 to allow access to the strap assemblies visually or physically.

Although the invention has been described above with reference to one or more preferred embodiments, it will be appreciated that various changes or modifications may be made without departing from the scope of the invention as defined in the appended claims.

For example, the third strap parts may be sprung to advance or retract rather than be moved manually. The quick release retainer assembly may include a latch or rotary retention device rather than the sprung button. The first and second strap parts may be formed as frameworks with a guideway for receiving the third strap part, rather than as blocks with slots. The aircraft wing may have a slat high lift device rather than a Krueger flap. The slat may deploy forwardly from the wing leading edge on a track or other mechanism. The leading edge panel may be a D-nose panel.

The invention claimed is:

1. An aircraft joint comprising:
a first component having an outer aerodynamic surface and an inner surface,
a second component having an outer aerodynamic surface and an inner surface, and
a strap assembly bridging between the inner surfaces of the first and second components, the strap assembly comprising
a first strap part attached to the inner surface of the first component, a second strap part attached to the inner surface of the second component, and a third strap part slidingly receivable in the first and second strap parts,
wherein the third strap part when received in the first and second strap parts constrains movement of the first component relative to the second component in a direction normal to the outer aerodynamic surfaces of the first and second components in the vicinity of the strap assembly,
wherein the strap assembly includes a quick release mechanism attached to the inner surface of the first or second components, and wherein the quick release mechanism automatically retains the third strap part when the third strap part is fully seated within the first strap part and received in the second strap part.

2. The joint according to, wherein the first and the second strap parts are spaced apart.

3. The joint according to claim 1, wherein the third strap part is a substantially planar strip.

4. The joint according to claim 1, wherein the first strap part has a blind slot for receiving the third strap part therein.

5. The joint according to claim 1, wherein the second strap part has a through slot for receiving the third strap part therein.

6. The joint according to claim 1, wherein at least one of the first strap part and the second strap part includes an adjuster configured for adjustment of an offset between the third strap part and an inner surface of the respective first or second strap parts.

7. The joint according to claim 1, wherein the third strap part is removable from the first strap part.

8. The joint according to claim 1, wherein at least one of the first strap part and the second strap part is attached by bonding to the respective first or second components.

9. The joint according to claim 1, wherein the outer aerodynamic surfaces of the first and second components are substantially flush across the joint.

10. The joint according to claim 9, wherein one of the first and second components includes a joggle such that the outer aerodynamic surface at an end of the joggled component abuts the inner surface of the other of the first and second components.

11. The joint according to claim 1, comprising a plurality of the strap assemblies bridging between the inner surfaces of the first and second components.

12. The joint according to claim 1, wherein the first and second components are aircraft wing components.

13. The joint according to claim 12, wherein the first and second components are a wing leading edge panel and a wing cover.

14. The joint according to claim 13, wherein the wing leading edge panel extends in a spanwise direction between ribs, and each spanwise end of the wing leading edge panel is attached to the ribs by fasteners, and an aft edge of the wing leading edge panel extending between the spanwise ends is coupled to the wing cover by a plurality of the strap assemblies.

15. A method of forming an aircraft joint, wherein the aircraft joint includes: a first component having an outer aerodynamic surface and an inner surface, a second component having an outer aerodynamic surface and an inner surface, and a strap assembly bridging between the inner surfaces of the first and second components, the strap assembly comprising a first strap part attached to the inner surface of the first component, a second strap part attached to the inner surface of the second component, and a third strap part slidingly receivable in the first and second strap parts, and a quick release mechanism attached to the inner surface of the first component or the inner surface of the second component, and the method comprises: attaching the first strap part to the first component, attaching the second strap part to the second component, bringing the first and second components together to a desired position, and sliding the third strap part so as to be received in the first and second strap parts, wherein the third strap part constrains movement of the first component relative to the second component in a direction normal to the outer aerodynamic surfaces of the first and the second components in the vicinity of the strap assembly, wherein the quick release mechanism automatically retains the third strap part wherein the third strap is fully sealed within the first strap part and received in the second strap part.

16. A method of replacing a panel on an aircraft wing, the aircraft wing comprising a wing cover having an outer aerodynamic surface and an inner surface, a wing panel having an outer aerodynamic surface and an inner surface, and a strap assembly bridging between the inner surfaces of the wing cover and the wing panel, the strap assembly comprising a first strap part attached to the inner surface of the wing cover, a second strap part attached to the inner surface of the wing panel, a third strap part slidingly receivable in the first and second strap parts, and a quick release mechanism attached to the inner surface of the wing cover or the inner surface of the wing panel, wherein the third strap part constrains movement of the wing cover relative to the wing panel in a direction normal to the outer aerodynamic surfaces of the wing cover and wing panel in the vicinity of the strap assembly when the third strap part is received in the first and second parts, and the method comprising:
sliding the third strap part free at least from the first strap part, removing the wing panel having the second strap part attached thereto and the third strap part from the aircraft wing,
providing a replacement wing panel and second strap part substantially identical to the wing panel and second strap part removed,
positioning the replacement wing panel on the aircraft wing,
sliding the third strap part so as to be received in the replacement second strap part and the first strap part, and
wherein the quick release mechanism automatically retains the third strap part when the third strap part is fully seated within the first strap part.

17. The method according to claim 16, wherein the third strap part is removed with the second strap part and is replaced with a replacement third strap part substantially identical to the third strap part removed, and the step of sliding the third strap part so as to be received in the first strap part relates to the sliding of the replacement third strap part.

* * * * *